(12) United States Patent
Newcomb et al.

(10) Patent No.: US 9,501,171 B1
(45) Date of Patent: Nov. 22, 2016

(54) GESTURE FINGERPRINTING

(71) Applicant: Famous Industries, Inc., San Francisco, CA (US)

(72) Inventors: Steven E Newcomb, San Francisco, CA (US); Mark H Lu, San Francisco, CA (US)

(73) Assignee: Famous Industries, Inc., San Francisco, CA (US)

( * ) Notice: Subject to any disclaimer, the term of this patent is extended or adjusted under 35 U.S.C. 154(b) by 97 days.

(21) Appl. No.: 14/454,441

(22) Filed: Aug. 7, 2014

Related U.S. Application Data

(63) Continuation-in-part of application No. 14/054,570, filed on Oct. 15, 2013.

(60) Provisional application No. 61/863,288, filed on Aug. 7, 2013, provisional application No. 61/714,130, filed on Oct. 15, 2012.

(51) Int. Cl.
*G06F 3/041* (2006.01)

(52) U.S. Cl.
CPC ........... *G06F 3/0416* (2013.01); *G06F 3/0412* (2013.01)

(58) Field of Classification Search
CPC .. G06F 1/1694; G06F 3/017; G06F 3/04883; G06F 2203/0381; G06F 2203/04808
See application file for complete search history.

(56) References Cited

U.S. PATENT DOCUMENTS

| 6,731,314 | B1 | 5/2004 | Cheng et al. |
| 6,922,724 | B1 | 7/2005 | Freeman et al. |
| 7,069,507 | B1 | 6/2006 | Alcazar et al. |
| 7,152,210 | B1 | 12/2006 | Van Den Hoven et al. |
| 7,469,381 | B2 | 12/2008 | Ording |
| 7,479,949 | B2 | 1/2009 | Jobs et al. |
| 7,786,975 | B2 | 8/2010 | Ording et al. |
| 8,701,032 | B1 * | 4/2014 | Zhai .................. G06F 3/04886 715/773 |
| 8,752,183 | B1 | 6/2014 | Heiderich et al. |
| 2002/0036618 | A1 | 3/2002 | Wakai et al. |
| 2002/0194388 | A1 | 12/2002 | Boloker et al. |
| 2003/0063073 | A1 | 4/2003 | Geaghan et al. |
| 2003/0101235 | A1 | 5/2003 | Zhang |
| 2004/0194115 | A1 | 9/2004 | Mogilevsky et al. |
| 2004/0230903 | A1 | 11/2004 | Elza et al. |
| 2004/0261083 | A1 | 12/2004 | Alcazar et al. |
| 2005/0012723 | A1 | 1/2005 | Pallakoff |
| 2005/0022211 | A1 | 1/2005 | Veselov et al. |

(Continued)

FOREIGN PATENT DOCUMENTS

| WO | 0129702 A2 | 4/2001 |
| WO | 03081458 A1 | 10/2003 |
| WO | 2011063561 A1 | 6/2011 |

OTHER PUBLICATIONS

International Search Report and Written Opinion for PCT/US2013/065124, mailed Mar. 10, 2014 (18 pages).

*Primary Examiner* — Ricardo L Osorio
(74) *Attorney, Agent, or Firm* — Patent Law Works LLP

(57) ABSTRACT

Various implementations related to gesture fingerprinting are described. In one such implementation, a computer-implemented method includes receiving input from a user entered via an input device; determining a gesture and one or more attributes associated with the gesture based on the input; matching the gesture to a gesture model for the user using the one or more attributes; and optimizing the gesture model based on subsequent input received from the user.

17 Claims, 4 Drawing Sheets

(56) References Cited

U.S. PATENT DOCUMENTS

| | | |
|---|---|---|
| 2006/0010400 A1* | 1/2006 | Dehlin .................. G06F 3/0354 715/856 |
| 2006/0080604 A1 | 4/2006 | Anderson |
| 2006/0101354 A1 | 5/2006 | Hashimoto et al. |
| 2006/0218511 A1 | 9/2006 | Kapoor |
| 2007/0110083 A1 | 5/2007 | Krishnamoorthy et al. |
| 2007/0250823 A1 | 10/2007 | Kono |
| 2008/0098296 A1 | 4/2008 | Brichford et al. |
| 2008/0126944 A1 | 5/2008 | Curtis et al. |
| 2008/0168384 A1 | 7/2008 | Platzer et al. |
| 2008/0209442 A1 | 8/2008 | Setlur et al. |
| 2009/0106775 A1 | 4/2009 | Cermak et al. |
| 2009/0210819 A1 | 8/2009 | Fujimoto et al. |
| 2010/0197395 A1 | 8/2010 | Geiss |
| 2010/0229186 A1 | 9/2010 | Sathish |
| 2010/0325575 A1 | 12/2010 | Platzer et al. |
| 2011/0164029 A1 | 7/2011 | King et al. |
| 2011/0196864 A1 | 8/2011 | Mason et al. |
| 2011/0202847 A1 | 8/2011 | Dimitrov |
| 2011/0261083 A1 | 10/2011 | Wilson |
| 2011/0264787 A1 | 10/2011 | Mickens et al. |
| 2012/0013619 A1 | 1/2012 | Brath |
| 2012/0017147 A1 | 1/2012 | Mark |
| 2012/0137233 A1 | 5/2012 | Lewontin |
| 2012/0173977 A1 | 7/2012 | Walker et al. |
| 2012/0174121 A1 | 7/2012 | Treat et al. |
| 2012/0191993 A1* | 7/2012 | Drader .................. G06F 1/3215 713/320 |
| 2012/0268364 A1* | 10/2012 | Minnen .................. G06F 3/017 345/156 |
| 2013/0086516 A1 | 4/2013 | Rodgers |
| 2013/0132818 A1 | 5/2013 | Anders et al. |
| 2013/0132895 A1 | 5/2013 | Németh et al. |
| 2013/0141375 A1* | 6/2013 | Ludwig .................. G06F 3/0488 345/173 |
| 2013/0159893 A1 | 6/2013 | Lewin et al. |
| 2013/0176308 A1 | 7/2013 | Mueller |
| 2013/0218721 A1* | 8/2013 | Borhan .................. G06Q 30/0207 705/26.41 |
| 2013/0266292 A1 | 10/2013 | Sandrew et al. |
| 2013/0326430 A1 | 12/2013 | Devi et al. |
| 2014/0157209 A1* | 6/2014 | Dalal .................. G06F 3/017 715/863 |
| 2014/0250360 A1 | 9/2014 | Jiang et al. |
| 2014/0289867 A1* | 9/2014 | Bukai .................. G06Q 20/4016 726/28 |
| 2014/0317577 A1* | 10/2014 | Chen .................. G06F 3/011 715/863 |
| 2014/0354540 A1* | 12/2014 | Barazi .................. G06F 3/0416 345/156 |
| 2015/0029092 A1* | 1/2015 | Holz .................. G06F 3/017 345/156 |
| 2015/0073907 A1* | 3/2015 | Purves .................. G06Q 20/32 705/14.58 |
| 2015/0091790 A1* | 4/2015 | Forutanpour .......... G06F 3/011 345/156 |
| 2015/0243324 A1 | 8/2015 | Sandrew et al. |
| 2015/0277569 A1* | 10/2015 | Sprenger .................. G06F 3/017 345/156 |
| 2015/0371023 A1* | 12/2015 | Chen .................. G06N 99/005 706/12 |

* cited by examiner

GESTURE FINGERPRINTING

CROSS-REFERENCE TO RELATED APPLICATIONS

This application is a continuation-in-part of U.S. patent application Ser. No. 14/054,570, entitled "Efficient Manipulation of Surfaces in Multi-Dimensional Space Using Energy Agents" filed Oct. 15, 2013, which claims the benefit under 35 U.S.C. 119(e) of U.S. Provisional Patent Application No. 61/714,130, entitled "User Input Conversion System Using Vector Agents for Rendering Images" filed Oct. 15, 2012, the entire contents of each of which are incorporated herein by reference. This application also claims the benefit under 35 U.S.C. §119(e) of U.S. Provisional Patent Application No. 61/863,288, entitled "Gesture Fingerprinting" and filed Aug. 7, 2013, the entire contents of which are incorporated herein by reference.

BACKGROUND

The present disclosure relates to gesture-fingerprinting technology. More particularly, for instance, the present disclosure relates to gesture-fingerprinting technology that allows a computing application running on a computing device to be self-adaptive and more responsive to varying computing gestures provided by the user.

Different users perform gestures (e.g., tap, swipe, pinch, drag, etc.) differently in order to provide input when using an application. For example, an older user may use a heavy tap on the screen to select a button while a younger user might use a soft tap to select the same button. In another example, a female user may use a flicking motion on the screen to scroll a page while a male user may use a throwing motion on the screen to scroll the same page. However, applications are generally not configured to distinguish between these different gesture variations, which can result in the application improperly interpreting the gestures. For instance, the application may misinterpret the same gestures over and over because a certain user may make those gestures in a unique way that suits the user. This can lead to a frustrating user experience, infrequent use or poor user adoption, and in some cases, user abandonment of the application.

SUMMARY

According to one innovative aspect of the subject matter described in this disclosure, a system includes one or more processors and an interpretation module executable by the one or more processors to interpret a gesture and one or more attributes associated with the gesture based on input received from a user on a computing device. The system also includes an application module coupled to the interpretation module or a data store to receive the gesture model and executable by the one or more processors to match the gesture to a gesture model for the user using the one or more attributes. The system also includes a learning module executable by the one or more processors to optimize the gesture model based on subsequent input received from the user.

Another innovative aspect of the subject matter described in this disclosure may be embodied in methods that include receiving, using one or more computing devices, input from a user entered via an input device; determining, using the one or more computing devices, a gesture and one or more attributes associated with the gesture based on the input; matching, using the one or more computing devices, the gesture to a gesture model for the user using the one or more attributes; and optimizing, using the one or more computing devices, the gesture model based on subsequent input received from the user.

Other implementations of one or more of these aspects or other aspects include systems, apparatus, and computer programs, configured to perform various actions and/or store various data related to gesture fingerprinting. These and other implementations, such as various data structures, are encoded on tangible computer storage devices. Numerous additional and/or alternative features may in some cases be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

DETAILED DESCRIPTION

Figure 1:
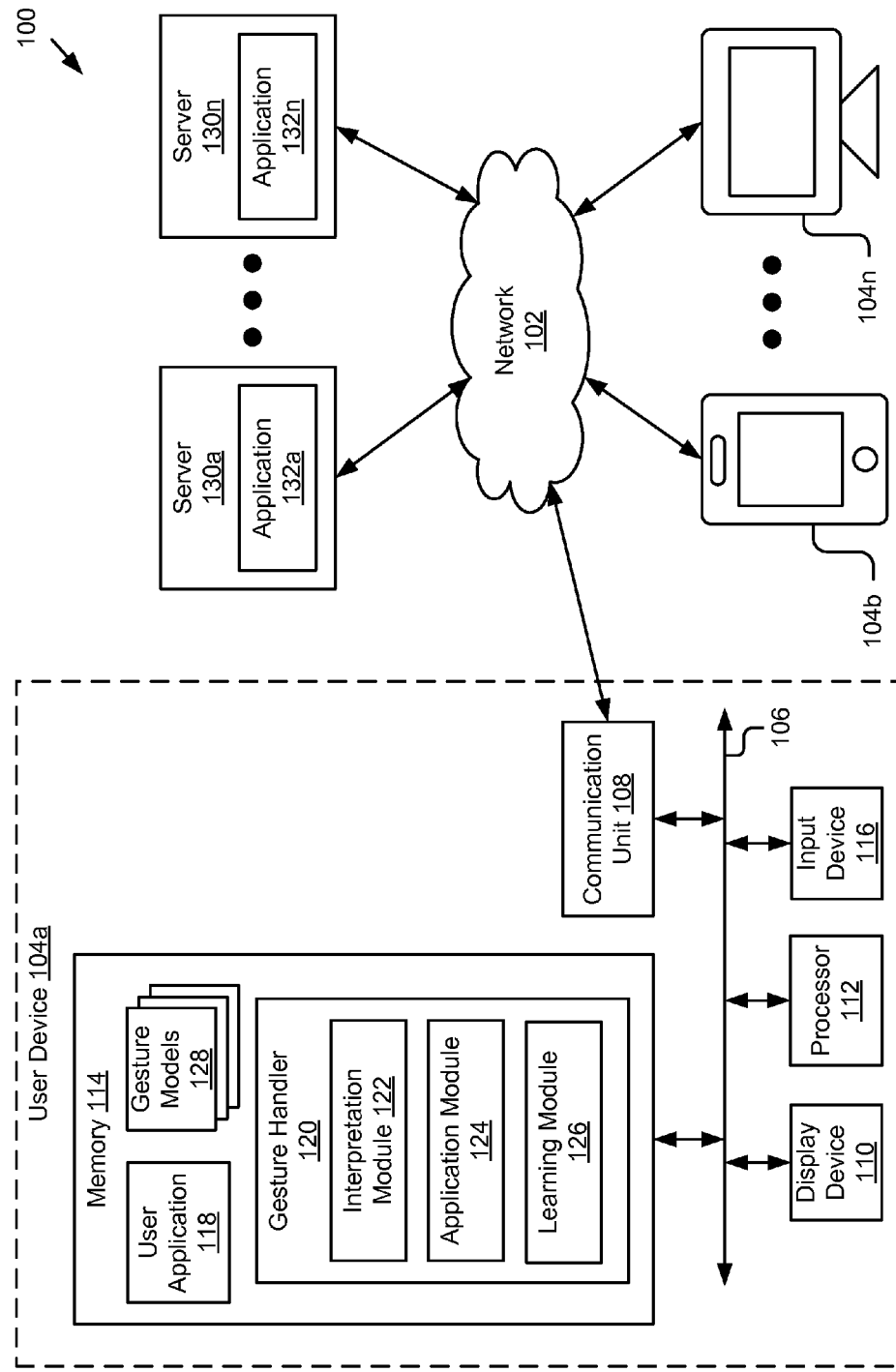
FIG. 1 is a block diagram illustrating an example system for gesture fingerprinting.

The present disclosure relates to gesture-fingerprinting technology. More particularly, for instance, the present disclosure relates to gesture-fingerprinting technology that allows a computing application (also referred to herein as a user application) running on a computing device (also referred to herein as user device) to be self-adaptive and more responsive to varying user inputs (also referred to herein as gestures). As depicted in FIG. 1, the gesture fingerprinting technology may include a system 100 having a plurality of user devices 104a, 104b . . . 104n (also referred to individually and collectively as 104) coupled via a network 102. The system 100 also includes a plurality of servers 130a . . . 130n hosting a plurality of applications 132a . . . 132n. Each of the entities 104a . . . 104n and/or 130a . . . 130n may be coupled to the network 102 for cooperation and electronic communication with one another. The architecture illustrated in FIG. 1 is provided by way of non-limiting example and it should be understood that numerous other configurations are possible and contemplated. For example, any number of computing devices (104 and/or 130) may be included in the system 100 and coupled to the network 102.

The network 102 may include any number of networks. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, peer to peer (P2P) networks, close proximity communication networks (e.g., Bluetooth®, NFC, etc.), various combinations thereof, etc.

The user devices 104 are computing devices having data processing and communication capabilities. The user devices 104 may couple to and communicate with one another and the other entities of the system 100 via the network 102 using a wireless and/or wired connection. As depicted in FIG. 1, a user device 104 may include a processor 112, a memory 114, a display device 110, an input device 116, a communication unit 108, and a communication bus 106 that couples its constituent hardware components for communication/signaling purposes. However, it should be understood that the user devices 104 are not limited to the components illustrated in the user device 104a, and may include one or more other components including for example, a power source (e.g., battery), a GPS receiver; a Bluetooth® module, sensors (e.g., accelerometers, gyroscopes, thermocouples), graphics processor, firmware, operating systems for managing the hardware and resources of the user devices 104, drivers, various physical connection interfaces (e.g., USB, HDMI, etc.), etc. Non-limiting examples of a user device 104 include a smartphone, a tablet computer, a laptop computer, a netbook computer, a desktop computer (e.g., equipped with a touchscreen), a computing surface (e.g., a computer-enabled countertop, a tabletop, a wall, etc.), and/or any other computing devices capable of providing similar acts and/or functionality.

The memory 114 may store instructions and/or data that may be executed by the processor 112. In the depicted implementation, the memory 114 stores a user application 118; a gesture handler 120 including an interpretation module 122, an application module 124, and a learning module 126; and a plurality of gesture models 128 as described below in further detail. The memory 114 is also capable of storing other instructions and data, including, for example, an operating system, hardware drivers, other software applications, databases, etc. The memory 114 is coupled to the bus 106 for communication with the processor 112 and the other components of the user device 104.

The communication unit 108 may include one or more interfaces for communicating with other computing devices. For example, the communication unit 108 may include wireless network transceivers (e.g., Wi-Fi™, Bluetooth®, cellular), wired network interfaces (e.g., a CAT-type interface), USB, Firewire, or other known interfaces. The communication unit 108 may provide connections to the network 102 and to other entities of the system 100 using standard communication protocols. The communication unit 108 may link the processor 112 to the network 102, which may in turn be coupled to other processing systems.

The display device 110 is a touch-screen display (e.g., OLED, AMOLED, etc.) capable of receiving input from one or more fingers of a user. For example, the display device 110 may be a capacitive touch-screen display capable of detecting and interpreting multiple points of contact with the display surface. The input device 116 may include touch sensitive component (e.g., a transparent touch sensitive layer) that is integrated with the display device 110 and capable of sensing input/gestures from the one or more fingers of a user. Additionally or alternatively, the input device 116 may also include a microphone, a front facing camera, a rear facing camera, and/or other motion sensors. Non-limiting examples of gestures that the input device 116 may be capable of receiving include a single touch gesture (i.e., swipe, tap, flick, stroke), a multiple touch gesture (i.e., zoom, grab), a mouse click, a keyboard stroke, a voice gesture (e.g., speech to text, voice command), a motion gesture (i.e., hand signal, body signal, eye movement), etc.

The user application 118 may be stored in the memory 114 and accessible and executable by the processor 112 of the user device 104 to provide for user interaction, and to send and receive data via the network 102. In particular, the user application 118 is code operable to instruct the user device 104 to render user interfaces, receive user inputs, and send information to and receive information from the server 130, and the other entities of the system 100. Non-limiting examples of the user application 118 may include web browsers, apps, multimedia applications, messaging applications (e.g., email, SMS, chat, video, etc.), video games, word processing applications, operating systems, operating system interfaces, etc.

Figure 3A:
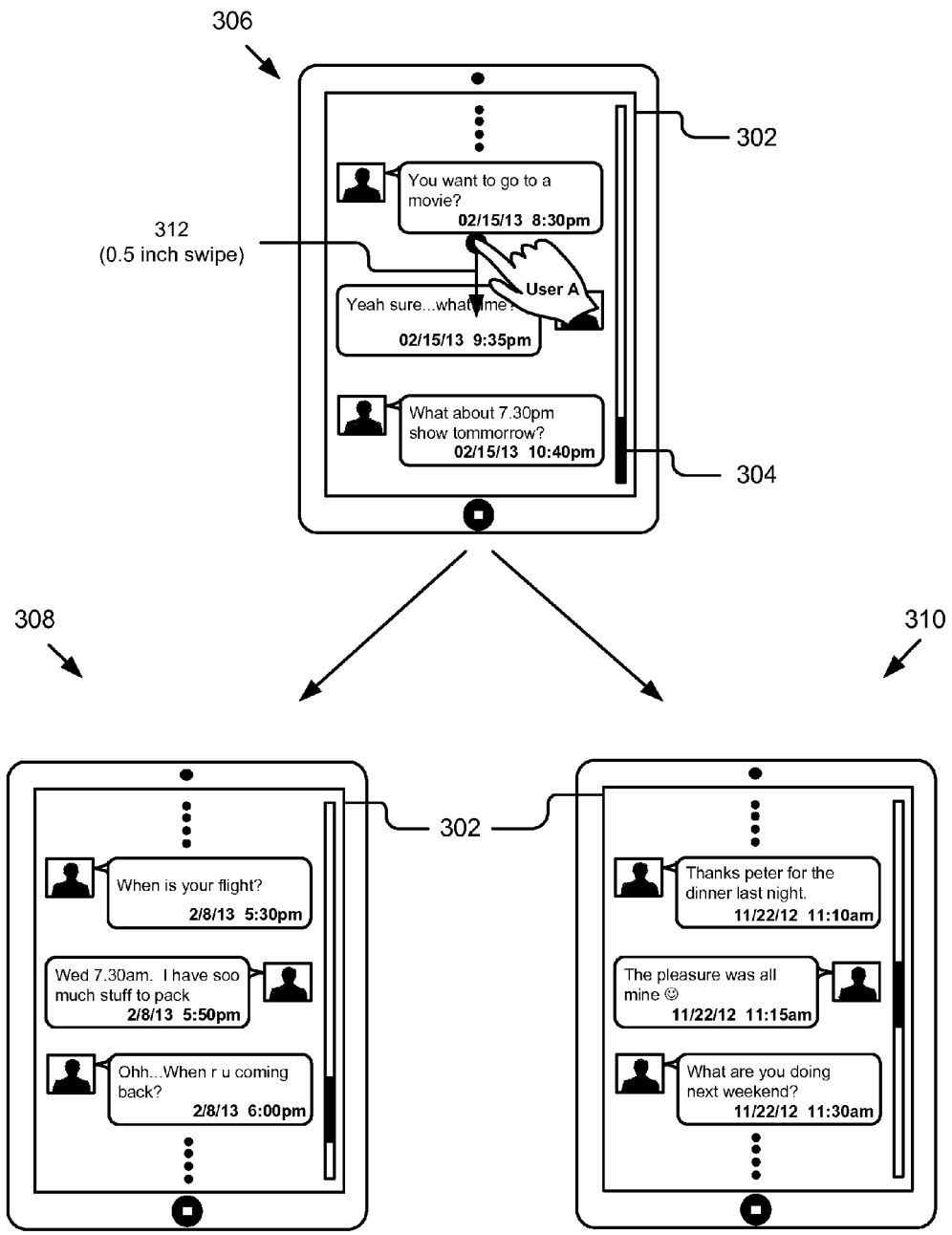
FIGS. 3A and 3B are graphic representations of example user interfaces for viewing a conversation thread between two or more users.
Figure 3B:
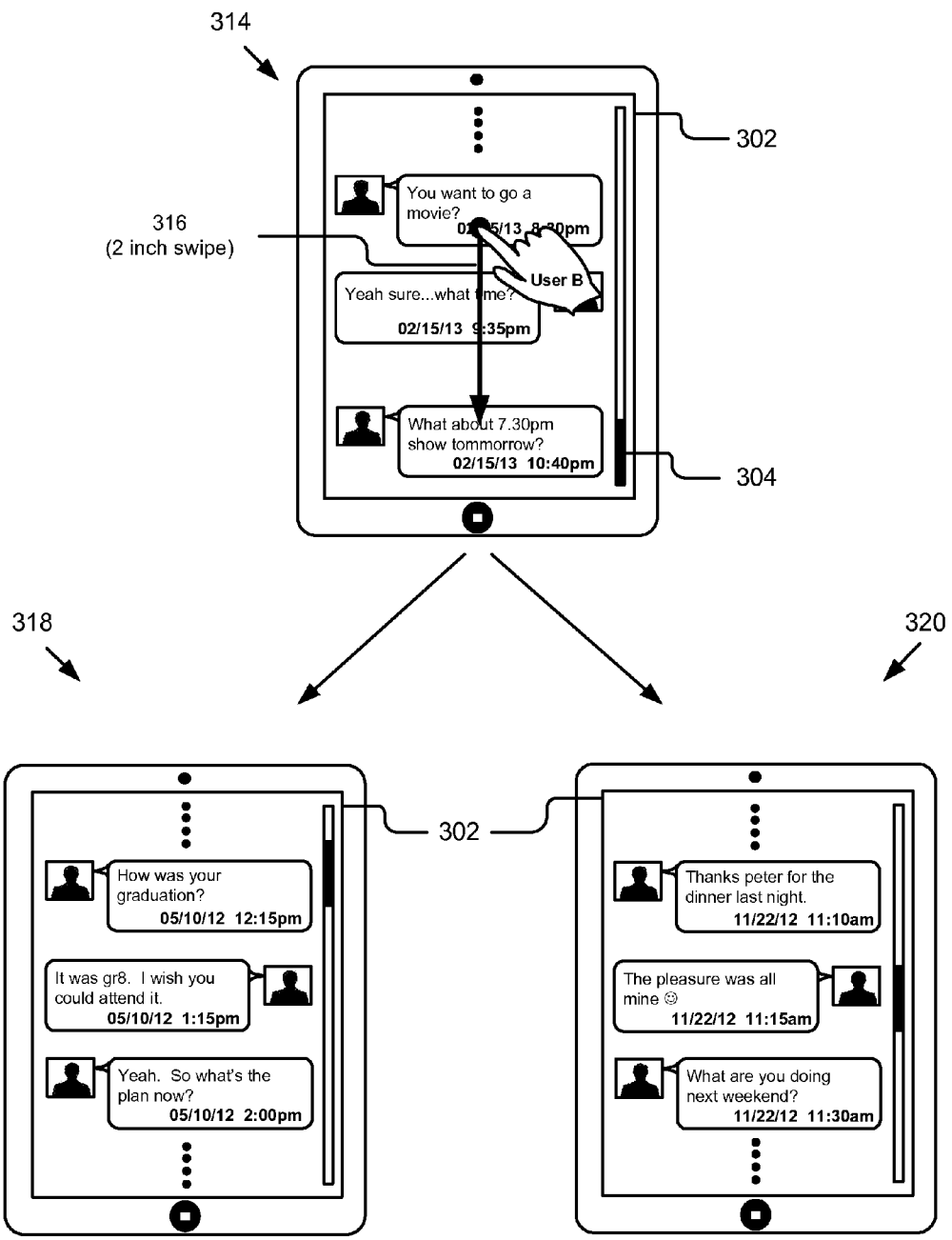

The user application 118 may generate and present user interfaces to a user of the user device 104 via the display device 110. For example, the user application 118 may generate and present the user interfaces as depicted in FIGS. 3A-B. In some implementations, the user application 118 receives the user instructions using mark-up language (e.g., HTML, XML, etc.), style sheets (e.g., CSS, XSL, etc.), graphics, and/or scripts (e.g., JavaScript, ActionScript, etc.). In some instances, the user application 118 receives user input/gestures from a user via the input device 116 of the user device 104, and provides the received input/gesture to the gesture handler 120 for processing. The user application 118 may be communicatively coupled to the gesture handler 120 (e.g., via the processor 112 and/or the bus 106).

The gesture models 128 represent the different variations of gestures that can be performed by users when using their user devices. In some implementations, a given gesture model is initially patterned after how a segment of users tend to input a particular gesture. For example, a first gesture model 128 may be configured for younger users who may tend to softly tap a display in order to select a user interface element (e.g., a button) and a second gesture model 128 may be configured for older users who tend to press the display with a substantial amount of force in order to select the same user interface element.

The gesture models 128 may include models for any type of user gesture and/or its variations. For instance, the gesture models 128 may include, without limitation, models for a soft tap, a hard tap, a flick (e.g., an abrupt, short swipe), a throw (e.g., a hard, long swipe), small, medium, and large pinches, etc. The gesture models 128 may be stored in a data store, such as the memory 114 of the user device 104, for later matching, application, and optimization, as discussed in further detail below. The interpretation module 122, the application module 124, the learning module 126, the gesture handler 120, and/or other components thereof, may be coupled to the data store, such as the memory 114, to manipulate (e.g., retrieve, update, delete, store, etc.) the gesture models 128, gesture profiles associated with the gesture models 128, user input, learning data, etc.

The gesture handler 120 includes software, logic, and/or routines for receiving and handling a user gesture, determining a suitable gesture model 128 based on the gesture, and optimizing the gesture model 128 based on subsequent user gestures that are received. As depicted in FIG. 1, the gesture handler 120 may include the interpretation module 122, the application module 124, and the learning module 126, although other arrangements are possible. For example, an alternative arrangement could combine the functionality of one or more of the components 122, 124, and/or 126 into a single component, or further divide the modules into separate additional cooperative components.

The gesture handler 120, and/or the interpretation module 122, the application module 124, and the learning module 126, and/or other components thereof, may be embodied by software stored in one or more memories (e.g., the memory 114 of the user device 104) that is accessible and executable by one or more processors (e.g., the processor 112) to perform the acts and/or functionality described herein. The gesture handler 120, and/or the interpretation module 122, the application module 124, and the learning module 126, and/or other components thereof, may be communicatively coupled to one another to send and receive data, such as gesture models 128, gesture profiles, user input, and/or any other data discussed herein.

In further implementations, the gesture handler 120, and/or the interpretation module 122, the application module 124, and the learning module 126, and/or other components thereof, may be implemented as executable software and/or hardware. For instances, one or more of these components may comprise logic embodied by and/or executable via one or more programmable logic devices (e.g., FPGA, PLA, PLD, etc.), application-specific integrated circuits, systems-on-a-chip, application-specific instruction-set processors, etc. Other suitable variations are also contemplated.

The interpretation module 122 includes software, logic, and/or routines for interpreting user gestures and attributes. The interpretation module 122 may interpret a user gesture in response to receiving an input from a user on the user device 104. In some implementations, the interpretation module 122 may determine, using the data from the input, the number of points of contact with a touchscreen, whether those points of contact are static or dynamic (e.g., have velocity), and/or further attributes associated with each point of contact, such as but not limited to, force/intensity, length of time in contact, distance moved, trajectory, path traveled, intermittence, and so forth. Based on one or more of these attributes, the interpretation module 122 may determine what type of gesture was used. The interpretation module 122 may be coupled to the user application 118, the input device 116, and/or another component to receive the inputs provided by a user.

The application module 124 includes software, logic, and/or routines for matching a gesture to a suitable gesture model based on one or more of the gesture attributes received from the interpretation module 122, and then applying the gesture model to current and/or future inputs received by the user. To match a gesture to an appropriate gesture model, the application module 124 may analyze the one or more attributes that characterize the gesture to determine which variation of the gesture was used. By way of further example, the application module 124 may determine a gesture to be: a hard-tap variant based on a "tap" gesture type and a high level of force compared to a baseline average; a soft-tap variant based on a "tap" gesture type and a low level of force compared to a baseline average; flick-swipe variant based on a "swipe" gesture type, a comparatively small amount of pressure and/or path length of the point of contact, and a comparatively high velocity of the point of contact; a throw-swipe variant based on a "swipe" gesture type and a comparatively large amount of pressure and/or path length of the point of contact; and so on.

Once the gesture variation is determined, the application module 124 may match the gesture type and variation to the set of gesture models 128 stored in the memory 114 to find a match. For example, the gesture models 128 may be indexed by one or more of gesture type, gesture variation, gesture attributes, etc., and the application module 124 query the gesture models 128 using one or more of these criteria to find a match. If a match is not found, the application module 124 may match a default or closest-approximate gesture model 128 to the gesture. In some implementations, the gesture models 128 may be pre-defined and stored in the memory 114.

In some implementations, the application module 124 may maintain gesture profiles for the users of a user device 104. When a given gesture model 128 is determined to apply to a gesture of the user, that gesture model 128 may be added by the application model 124 to the user's gesture profile and then applied when performing an action associated with the gesture. For instance, the application module 124 may signal a rendering engine (not shown) to render a navigational effect (e.g., scroll, zoom, display, animate, etc., content) in manner that is unique to the user based on the user's gesture profile. By way of illustration, the gesture profile for an elderly user may indicate that the elderly user has trouble with rapid animation effects and, based on this profile, the rendering engine may animate the content being displayed at a slower pace that is optimized to the elderly user. The rendering engine (not shown) may be coupled to a display of the display device 110 to provide content for display to the user.

The user gesture profiles may be temporary or may be stored on a more permanent basis for later access and application. For example, upon user login, the application module 124 may apply that user's gesture profile so that the system 100 does not have to re-interpret the user's gesture behavior and/or re-determine which gesture models 128 apply to that user. Over time, as the user's behavior is further analyzed and/or changes, that user's gesture profile may be modified (added to, subtracted from, optimized, etc.) to reflect those changes (e.g., by the application module 124 and/or the learning module 126).

The learning module 126 includes software, logic, and/or routines for optimizing the applied gesture model(s) 128 and/or gesture profile based on learning performed on subsequent gestures received from the user. In some implementations, the learning module 126 may receive gesture-related information as interpreted by the interpretation module 122 and compare that information to the gesture models 128 applied by the application module 124 to determine if the proper gesture models 128 have been applied, whether one or more variables of algorithms used by the applied gesture model(s) 128 need to be adjusted to better predict the intentions of the user, etc. By way of further non-limiting example, the learning module 126 may determine how many pinch-to-zoom gestures a given user must use to zoom completely out in a given view, and whether the number of zoom gestures used is excessive as compared to a baseline. If so, the learning module 126 may adjust the applied pinch-to-zoom gesture model 128 to zoom out more each time the user inputs that gesture to improve that user's overall user experience (by not requiring the user to zoom as much to reach the same result). In some implementations, if the learning module 126 determines that the applied user model 128 for a given gesture is incorrect, the learning module 126 may signal the application module 124 to apply a more appropriate gesture model by indicating a new gesture type and/or variation.

The servers 130a . . . 130n (also referred to individually and collectively as 130) may each include one or more computing devices having data processing, storing, and communication capabilities. For example, a server 130 may include one or more hardware servers, server arrays, storage devices and/or systems, etc. In some implementations, the servers 130a . . . 130n may include one or more virtual servers, which operate in a host server environment and access the physical hardware of the host server including, for example, a processor, memory, storage, network interfaces, etc., via an abstraction layer (e.g., a virtual machine manager).

In the depicted implementation, the servers 130a . . . 130n include applications 132a . . . 132n (also referred to individually and collectively as 132) operable to provide various computing functionalities, services, and/or resources, and to send data to and receive data from the other entities of the network 102, such as the user devices 104. For example, the application 132 may provide functionality for user account management, internet searching; social networking; web-based email; word-processing; banking; finance; blogging; micro-blogging; photo management; video, music and multimedia hosting, distribution, and sharing; business services; news and media distribution; any combination of the foregoing services; etc. It should be understood that the server 130 is not limited to providing the above-noted services and may include other network-accessible services.

The applications 132 may transmit electronic files and/or data embodying the services they provide to the user devices 104 for rendering by the user application 118 operable thereby. In some implementations, the electronic files and/or data streams may be formatted using a markup language(s) (e.g., HTML, XML, etc.), style sheet(s) (e.g., CSS, XSL, etc.), graphic(s) (e.g., PNG, JPG, GIF, etc.), and/or scripts (e.g., JavaScript, ActionScript, etc.), and the user devices 104 may interpret and/or execute the electronic files and/or data streams and render an interactive Web User Interface (WUI) for presentation to users on display device 110. Users may input gestures to manipulate these user interfaces, and the gesture handler 120 may process and optimize these gestures as discussed elsewhere herein.

Figure 2:
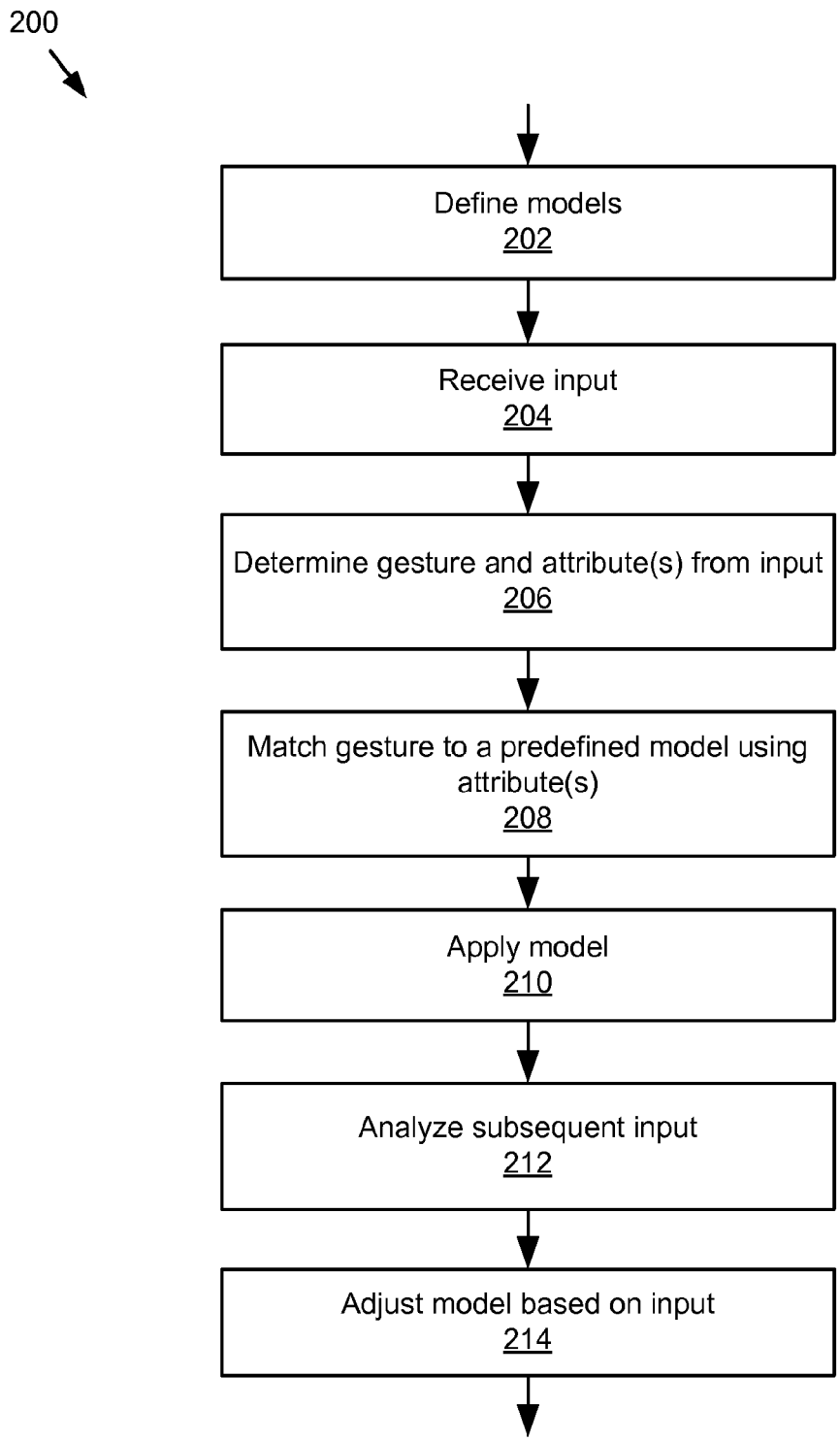
FIG. 2 is flowchart of an example method for gesture fingerprinting.

FIG. 2 is a flowchart of an example method 200 for gesture fingerprinting. In particular, FIG. 2 is a flowchart for determining a suitable gesture model based on a user input and adjusting the model using subsequent user input. The method 200 may begin by defining 202 gesture models 128. In some implementations, the gesture models 128 may be predefined. For example, the gesture models 128 may be manually defined and stored in the memory 114 in the manner discussed above with respect to the application module 124.

The method 200 may continue by receiving 204 an input (e.g., a gesture) from a user, such as a touch-based gesture (e.g., tap, swipe, zoom, grab, drag, etc.) input by the user into a user interface generated and presented by the user application 118. In some implementations, the user application 118 and/or the input device 116 may receive the user input/gesture, and may signal the interpretation module 122 to interpret the gesture that the user has input. Upon receiving the input, the interpretation module 122 may further determine 206 the gesture and one or more attributes thereof, as discussed elsewhere herein.

The method 200 may then match 208 the gesture to a pre-defined gesture model 128 stored in the memory 114 based on the gesture attributes. In some implementations, the application module 124 may analyze the gesture attributes to determine the variation of the gesture and then query the memory 114 for a matching gesture model 128 based thereon. In some implementations, responsive to identifying a suitable gesture model for the user, the method 200 may apply 210 the model to the current gesture and/or subsequent gestures being received and interpreted to improve the how the user application 118 responds to receiving user input.

For instance, in block 212, the method 200 may analyze subsequent gestures input by the user, and based thereon, may adjust 214 the gesture model 128 (e.g., improve or adapt the gesture model 128, change to a different gesture model 128, etc.) to improve performance. In some implementations, this machine learning may be performed by the learning module 126, as discussed elsewhere herein. By way of further illustration, if a given user uses long and hard swipes to scroll through a chat history, and it takes the user over five swipes to reach to top of the history thread, then the learning module 126 may optimize the applied swipe gesture model 128 so it scrolls the thread further with each swipe. This is advantageous because it allows the user to reach his/her desired destination using an optimized number of gestures (e.g., not too few and not too many) as defined by a pre-determined baseline stored in the memory 114.

FIGS. 3A-B are graphic representations of example user interfaces 302 for viewing a conversation thread between two or more users. FIG. 3A shows a user (e.g., user A) who has the tendency to perform small swipes (flicks) to scroll the thread while FIG. 3B shows a user (user B) who has a tendency to perform long swipes (throws) to scroll the thread.

Referring to FIG. 3A, in stage 306, the scroll bar 304 is at the bottom of the conversation thread and the user A is inputting a short (e.g., 0.5 inch) downward swipe gesture 312 to scroll upward in the conversation thread. Stage 308 illustrates a case where the user interface 302 does not scroll far enough upward because of the shortness of the swipe gesture 312. This can be caused by a gesture model 128 being used that is not adapted to the specific gesture attributes of the user. In contrast, state 310 shows that the user interface 302 scrolls a more appropriate distance when a gesture model 128 adapted to the user's short gesture attributes is applied by the system 100.

Similarly, referring to FIG. 3B, in stage 314, the scroll bar 304 is at the bottom of the conversation thread and the user A is inputting a long (e.g., 2 inch) downward swipe gesture 316 to scroll upward in the conversation thread. Stage 318 illustrates a case where the user interface 302 scrolls too far because of the length of the swipe gesture 316. This can be caused by a gesture model 128 being used that is not adapted to the specific gesture attributes of the user. In contrast, state 318 shows that the user interface 302 scrolls a more appropriate distance when a gesture model 128 adapted to the user's long swipe gesture attributes is applied by the system 100.

It should be understood that the present disclosure is illustrated by way of example, and not by way of limitation in the figures of the accompanying drawings in which like reference numerals are used to refer to similar elements. Further, in the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in other suitable ways. Additionally, the disclosure is not limited to implementation in any specific programming language, or for any specific operating system or environment.

What is claimed is:

1. A computer-implemented method comprising:
   receiving, using one or more computing devices, input from a user entered via an input device;
   determining, using the one or more computing devices, a gesture and one or more attributes associated with the gesture based on the input;

matching, using the one or more computing devices, the gesture to a gesture model for the user using the one or more attributes, the gesture model being initially patterned after how a segment of users input the gesture to perform an action;

receiving, using the one or more computing devices, one or more subsequent inputs from the user entered via the input device to perform the action;

determining, by the one or more computing devices, based on the one or more subsequent inputs, whether the gesture model is appropriate for the user; and responsive to determining the gesture model is not appropriate for the user, automatically adjusting, using the one or more computing devices, the gesture model by self-adapting the gesture model to improve overall experience for the user in a future iteration.

2. The computer-implemented method of claim 1, further comprising:

defining, using the one or more computing devices, a plurality of gesture models including the gesture model, the plurality of gesture models being associated with a plurality of users including the user.

3. The computer-implemented method of claim 2, wherein the plurality of gesture models represent a plurality of different variations of gestures performable by users using computing devices.

4. The computer-implemented method of claim 1, wherein the gesture model is predefined for a particular variation of gesture and stored in a data store.

5. The computer-implemented method of claim 1, wherein the input reflects an input provided by the user using a touch-based user interface.

6. The computer-implemented method of claim 1, wherein matching the gesture to the gesture model associated with the user using the one or more attributes includes analyzing the one or more attributes to determine a variation of the gesture and querying a data store for a matching gesture model based on the variation.

7. A system comprising:
one or more processors; and
one or more memories storing instructions that, when executed by the one or more processors, cause the system to perform operations including:
receiving input from a user entered via an input device;
determining a gesture and one or more attributes associated with the gesture based on the input;
matching the gesture to a gesture model for the user using the one or more attributes, the gesture model being initially patterned after how a segment of users input the gesture to perform an action;
receiving one or more subsequent inputs from the user entered via the input device to perform the action;
determining, based on the one or more subsequent inputs, whether the gesture model is appropriate for the user; and
responsive to determining the gesture model is not appropriate for the user, automatically adjusting the gesture model by self-adapting the gesture model to improve overall experience for the user in a future iteration.

8. The system of claim 7, wherein the instructions, when executed by the one or more processors, further cause the system to perform operations including:

defining a plurality of gestures models including the gesture model, the plurality of gesture models being associated with a plurality of users including the user.

9. The system of claim 8, wherein the plurality of gesture models represent a plurality of different variations of gestures performable by users using computing devices.

10. The system of claim 7, wherein the gesture model is predefined for a particular variation of gesture and stored in a data store.

11. The system of claim 7, wherein the input reflects an input provided by the user using a touch-based user interface.

12. The system of claim 7, wherein matching the gesture to the gesture model associated with the user using the one or more attributes includes analyzing the one or more attributes to determine a variation of the gesture and querying a data store for a matching gesture model based on the variation.

13. A system comprising:
one or more processors;
an interpretation module executable by the one or more processors to interpret a gesture and one or more attributes associated with the gesture based on input received from a user on a computing device via an input device;
an application module coupled to the interpretation module or a data store to receive a gesture model and executable by the one or more processors to match the gesture to a gesture model for the user using the one or more attributes, the gesture model being initially patterned after how a segment of users input the gesture to perform an action; and
a learning module executable by the one or more processors to:
receive one or more subsequent inputs from the user entered via the input device to perform the action;
determine, based on the one or more subsequent inputs, whether the gesture model is appropriate for the user; and
responsive to determining the gesture model is not appropriate for the user, automatically adjust the gesture model by self-adapting the gesture model to improve overall experience for the user in a future iteration.

14. The system of claim 13, further comprising:
the data store storing a plurality of gestures models including the gesture model, the plurality of gesture models being associated with a plurality of users including the user.

15. The system of claim 14, wherein the plurality of gesture models represent a plurality of different variations of gestures performable by users using computing devices.

16. The system of claim 13, wherein the input reflects an input provided by the user using a touch-based user interface.

17. The system of claim 13, wherein to match the gesture to the gesture model associated with the user using the one or more attributes includes analyzing the one or more attributes to determine a variation of the gesture and querying the data store for a matching gesture model based on the variation.

* * * * *